United States Patent
Doetsch et al.

(10) Patent No.: US 7,425,228 B2
(45) Date of Patent: Sep. 16, 2008

(54) HOMOGENEOUS, BORON-DOPED ALKALINE EARTH PEROXIDES

(75) Inventors: Werner Doetsch, Linz (DE); Gabriele Wasem, Hausen (DE)

(73) Assignee: Solvay Chemicals GmbH, Hannover (DE)

( * ) Notice: Subject to any disclaimer, the term of this patent is extended or adjusted under 35 U.S.C. 154(b) by 0 days.

(21) Appl. No.: 10/781,855

(22) Filed: Feb. 20, 2004

(65) Prior Publication Data

US 2004/0221632 A1    Nov. 11, 2004

Related U.S. Application Data

(63) Continuation of application No. PCT/EP02/07334, filed on Jul. 3, 2002.

(30) Foreign Application Priority Data

Aug. 21, 2001  (DE)  ................ 101 40 858

(51) Int. Cl.
C05D 3/02   (2006.01)
C05D 9/00   (2006.01)
C05D 9/02   (2006.01)

(52) U.S. Cl. .............................. 71/31; 71/63
(58) Field of Classification Search ............ 71/31, 71/63
See application file for complete search history.

(56) References Cited

U.S. PATENT DOCUMENTS 5,395,419 A * 3/1995 Farone et al. ............ 71/63
5,567,221 A * 10/1996 Larson et al. ............ 71/28
6,193,776 B1   2/2001 Doetsch et al. .......... 71/63

FOREIGN PATENT DOCUMENTS

| DE | 196 50 686 | 6/1998 |
|---|---|---|
| GB | 1 575 792 | 1/1978 |
| GB | 1 580 248 | 11/1980 |
| JP | 53 017155 | 2/1978 |
| JP | 61 033104 | 2/1986 |
| JP | S61-33104 A | 2/1986 |
| JP | 62-103002 A | 5/1987 |
| JP | 63 270612 | 11/1988 |
| RU | 2 073 436 | 2/1997 |

OTHER PUBLICATIONS

"Essential Plant Nutrients", http://web.archive.org/web/20010819100732/http://soils.clemson.edu/elements.htm, Mar. 2, 2001.*
"Granulatiion", Chapter 25, Pharmaceutics, Aulton et al., Apr. 1988, first edition, Publishers Churchill Livingstone.*
Grant & Hackh's Chemical Dictionary, Fifth Edn., 1987, p. 194.*
Websters Unabridges Dictionary, 1992, p. 426.*
The Free Dictionary.com, downloaded Jun. 22, 2005, http://www.thefreedictionary.com/doped.*
Wolf et al., *Silicon Processing for the VLSI Era*, vol. 1—Process Technology, Chapter 1, pp. 1-35, Lattice Press, California, USA.

* cited by examiner

*Primary Examiner*—C. Sayala
(74) *Attorney, Agent, or Firm*—Crowell & Moring LLP

(57) ABSTRACT

Homogeneous, boron-doped alkaline earth peroxides and mixed alkaline earth peroxides, methods for the production thereof, and use thereof as oxygenating agents for agricultural purposes.

8 Claims, No Drawings

HOMOGENEOUS, BORON-DOPED ALKALINE EARTH PEROXIDES

CROSS REFERENCE TO RELATED APPLICATIONS

This application is a continuation of international patent application no. PCT/EP02/07334, filed Jul. 3, 2002 designating the United States of America, and published in German as WO 03/018470 A1, the entire disclosure of which is incorporated herein by reference. Priority is claimed based on Federal Republic of Germany patent application no. DE 101 40 858.7, filed Aug. 21, 2001.

BACKGROUND OF THE INVENTION

The invention relates to homogeneous, boron-doped alkaline earth peroxides, to the production thereof and to the use thereof, particularly in agriculture.

It is known to use alkaline earth peroxides, such as for example calcium or magnesium peroxide, as an oxygen source in aerobic processes, such as in the treatment of organic waste, in soil remediation ("in situ bioremediation") or in waste water treatment. It is furthermore known to use calcium peroxide for agricultural purposes, in particular for direct sowing.

According to JP 62-103002 a calcium/magnesium peroxide improves cultivation performance with regard to germination, seedling emergence and initial growth of the plants.

In order to improve cultivation performance, the seed is conventionally treated with a pilling composition which, apart from the oxygenating agent, for example contains active ingredients, nutrients, bentonite etc. The individual components of this mixture are mixed together and the seeds are then coated with the mixture.

Sodium perborate is conventionally described as the oxygenating agent which, being a water-soluble compound, is capable of supplying not only oxygen but additionally the boron essential to plant growth.

Although, by virtue of this bifunctionality (oxygen release and boron content), sodium perborate ought to be the oxygenating agent of choice, considerable technical problems are to be expected with the use of sodium perborate in the pilling process. Due to sodium perborate's elevated water solubility, there is a risk that hydrogen peroxide released during the pilling process will react with readily oxidizable components from the pilling composition, which both limits the availability of oxygen and reduces the desired effectiveness of the pilling composition.

SUMMARY OF THE INVENTION

It is an object of the present invention to provide new homogeneous, boron-doped alkaline earth peroxides.

Another object of the invention is to provide a new process of producing homogeneous, boron-doped alkaline earth peroxides.

A further object is to provide boron-enriched inorganic peroxides, which are distinguished by low water solubility and elevated thermal oxygen stability.

It is also an object of the invention to provide bifunctional, boron-doped alkaline earth peroxides.

An additional object is to provide a method of treating seeds with suitable boron-containing compounds which yields improved benefits with regard to oxygen and boron release in the seed.

These and other objects of the invention are achieved in accordance with the present invention by providing a homogeneous, boron-doped alkaline earth peroxide having a boron content of 0.5 to 5 wt. % and a peroxide content of about 75 wt. % or more, calculated based on the active oxygen content.

In accordance with further aspects of the invention, the objects are achieved by the methods and uses described hereinafter.

Accordingly, the invention relates to the provision of homogeneous, boron-doped alkaline earth peroxides or mixed peroxides, in particular boron-doped calcium peroxide; to a simple method for their production, and to appropriate uses thereof.

The homogeneous boron-doped alkaline earth peroxide according to the invention having a peroxide content of about 75 wt. % or more, calculated from the active oxygen content, may be produced in a straightforward manner in conventional processes for the production of alkaline earth peroxides by adding a suitable boron source as an additional starting material or by bringing the corresponding alkaline earth peroxide suspension into contact with the boron source. Metaborate solution and boric acid are particularly suitable as boron sources, but other boron-containing materials may be used.

The invention also relates to a process for the production of homogeneous, boron-doped alkaline earth mixed peroxides, in particular homogeneous, boron-doped calcium/magnesium peroxides. In this process, homogeneous calcium/magnesium peroxide is brought into contact with a boron source.

The homogeneous calcium/magnesium peroxide is produced using the process described in Doetsch et al., U.S. Pat. No. 6,193,776 (=DE 196 50 686), the disclosure of which is incorporated herein by reference, by reacting an aqueous solution or a suspension of calcium hydroxide and magnesium oxide and/or magnesium hydroxide with an aqueous hydrogen peroxide solution at a temperature of below 60° C.

This calcium/magnesium peroxide suspension is brought into contact with the boron source. It is also within the scope of the invention initially to obtain the calcium/magnesium mixed peroxide as a solid reaction product and subsequently to produce a calcium/magnesium peroxide suspension, into which the boron compound is then introduced.

The present invention accordingly also relates to a process for the production of the homogeneous, boron-doped calcium peroxide in which a calcium peroxide suspension is stirred together with metaborate solution or boric acid and a 30 to 70 wt. % aqueous hydrogen peroxide solution.

In another embodiment, an aqueous suspension of calcium hydroxide and metaborate solution is reacted with an aqueous hydrogen peroxide solution.

Once the reaction is complete, the water is evaporated and the reaction product dried.

Calcium peroxide suspensions with a solids contents of 250 to 400 g/liter are preferably used and stirred together with sodium metaborate solution or aqueous, saturated boric acid solution. The quantities of boron solution to be added are determined here by the boron content which the final product is intended to have.

The boron-doped calcium peroxide is dried in a spray dryer at an exhaust air temperature of 120° C. and may be finished in a desired manner or formulated with conventional seed treatment components.

The homogeneous, boron-doped calcium peroxide produced according to the invention is distinguished by a boron content of 0.5 to 5 wt. % of boron and has a calcium peroxide content (calculated from the active oxygen content) of ~75% or more.

The boron-doped calcium peroxide may contain small quantities of additives and/or stabilisers conventional for per compounds. Such additives include, for example, water glass or active oxygen stabilizers such as phosphonic acids and the salts thereof.

In comparison with sodium perborate, the product according to the invention has advantageous stability characteristics. Accordingly, the dry stability loss (2 hours at 105° C., see method 1) is, for example, less than 10% and the wet stability loss (20 min. at 90° C., see method 2) is in each case less than 10%.

The homogeneous, boron-doped calcium peroxide according to the invention is distinguished by a series of advantages.

A boron-doped calcium peroxide is provided in the form of a very finely divided target product (grain diameter <<50 μm) in which, due to the nature of the process, the boron component is virtually ideally and homogeneously distributed. Any segregation of the boron and calcium peroxide components is thus precluded during subsequent use in the pilling process.

It is thus possible to dispense with elaborate mixing steps for incorporating separate boron compounds into the pilling compositions, in particular for treating sugar beet seed.

When used as an oxygenating agent in seed treatment, the boron-doped calcium peroxide simultaneously fulfils the function of the required boron source.

EXAMPLES 1-3

A calcium peroxide suspension having the following composition:

79.3% calcium peroxide
5.3% calcium carbonate
8.5% calcium hydroxide was combined in a reaction vessel with sodium metaborate solution and aqueous hydrogen peroxide solution was added. The quantity of sodium metaborate solution added was determined by desired boron content in the final product. The quantity of hydrogen peroxide added was selected such that more than 1 mole of hydrogen peroxide is added per mole of boron. The reaction product was dried in a spray dryer at 17,000 rpm, feed air temperature 400° C., exhaust air temperature 120° C.

EXAMPLE 4

The quantity of boron required for the target product was added in the form of sodium metaborate solution to the calcium peroxide suspension according to the above Example. The boron-doped calcium peroxide was worked up in a manner similar to the preceding Example. The aqueous hydrogen peroxide solution was not added.

TABLE 1

| Example | Calcium peroxide suspension in l (c = 297 g/l) | Addition of $NaBO_2$ soln. in ml (c = 243.2 g/l) | Addition of $H_2O_2$ in g (c = 50% wt./wt.) | % B in final product (analyzed) |
|---|---|---|---|---|
| 1 | 5 | 391 | 150 | 0.97 |
| 2 | 5 | 782 | 300 | 1.75 |
| 3 | 4 | 1600 | 400 | 3.5 |
| 4 | 5 | 782 | — | 1.6 |

EXAMPLE 5

The quantity of boron required for the target product was added in the form of a saturated boric acid solution to the calcium peroxide suspension according to the above Example. The boron-doped calcium peroxide was worked up in known manner.

TABLE 2

| Example | Calcium peroxide suspension in l (c = 297 g/l) | Addition of $H_3O_3$ in g in aqueous solution | Addition of $H_2O_2$ in g (c = 60% wt./wt) | % B in final product (analyzed) |
|---|---|---|---|---|
| 5 | 5 | 160 | — | 1.4 |

EXAMPLE 6

After the end of the reaction, 100 g of $H_3BO_3$ in a saturated aqueous solution and 140 ml of sodium water glass solution were apportioned to the third peroxide suspension, which was produced from the following reaction components 12.1 kg of $Ca(OH)_2$, 1.2 kg of $Mg(OH)_2$ and 9.2 of kg $H_2O_2$, 60% wt./wt. and worked up as in the foregoing examples.

TABLE 3

| Example | Mixed peroxide suspension in l (c = 300 g/l) | Addition of $H_3O_3$ in g in aqueous solution | Addition of $H_2O_2$ in g (c = 60% wt./wt) | % B in final product (analyzed) |
|---|---|---|---|---|
| 6 | 3 | 100 | — | 1.7 |

The stability of the homogeneous, boron-doped peroxides at elevated temperature was determined based on the loss of active oxygen. Both the wet stability and the dry stability of the boron-doped peroxides were determined. The stability loss in % was obtained as the ratio of the difference between the retained active oxygen content and the original active oxygen content relative to the original active oxygen content multiplied by 100.

Method 1: (Wet Stability) 1 g of a peroxide sample of known active oxygen content was combined with 1.56 ml of water and placed in a sealed vessel for 20 minutes at 90° C. in a temperature-controlled bath. The sample was then dissolved in approx. 100 ml of mixed acid (composition: 1 liter of HCl, 37 wt. %; 1 liter of $H_3PO_4$, 85 wt. %; 6 liters of $H_2O$) and titrated with potassium permanganate solution until a persistent, pale pink color was obtained. The stability loss in % is obtained as the ratio of the difference between the retained active oxygen content and the original active oxygen content relative to the original active oxygen content multiplied by 100.

Method 2: (Dry Stability)

1 g of a peroxide sample of known active oxygen content was placed in a test tube for 2 hours at 105° C. in a temperature-controlled bath. The sample was then dissolved in approx. 100 ml of mixed acid (composition: 1 liter of HCl, 37 wt. %; 1 liter of $H_3PO_4$, 85 wt. %; 6 liters of $H_2O$) and titrated with potassium permanganate solution until a persistent, pale pink color was obtained. The stability loss in % was obtained as the ratio of difference between the retained active oxygen content and the original active oxygen content relative to the original active oxygen content multiplied by 100.

TABLE 4

Calcium peroxide content calculated from active oxygen

| Example | CaO$_2$ content % |
|---------|-------------------|
| 1 | 84.2 |
| 2 | 83.7 |
| 3 | 81.4 |
| 4 | 76.9 |
| 5 | 74.6 |

TABLE 5

Stability

| Example | Wet stability loss 20 min/90° C. | Dry stability loss 2 h/105° C. |
|---------|----------------------------------|-------------------------------|
| 1 | 9.7% | 7% |
| 4 | 3.5% | 4.4% |
| 5 | 3.9% | 2.9% |

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A homogeneous, boron-doped alkaline earth peroxide having a boron content above 0.97 wt. % and below 1.6 wt. %, and a peroxide content of about 75 wt. % or more, calculated based on the active oxygen content.

2. A homogeneous, boron-doped alkaline earth peroxide according to claim 1, wherein the alkaline earth peroxide is a calcium peroxide or an alkaline earth mixed peroxide.

3. A homogeneous, boron-doped alkaline earth peroxide according to claim 2, wherein the alkaline earth mixed peroxide is a mixed calcium/magnesium peroxide.

4. A process for producing a homogeneous, boron-doped alkaline earth peroxide according to claim 1, said process comprising:

reacting an aqueous solution or suspension containing alkaline earth hydroxide and hydrogen peroxide with sodium metaborate solution and aqueous hydrogen peroxide solution, or sodium metaborate solution, or boric acid, and evaporating water to obtain a solid and drying the solid to obtain the homogeneous, boron-doped alkaline earth peroxide product.

5. A process for producing a homogeneous, boron-doped alkaline earth peroxide according to claim 1, said process comprising:

reacting an aqueous solution or suspension of calcium hydroxide and sodium metaborate solution with an aqueous hydrogen peroxide solution, and evaporating water to obtain a solid and drying the solid to obtain the homogeneous, boron-doped alkaline earth peroxide product.

6. A process for producing a homogeneous, boron-doped alkaline earth peroxide according to claim 1, said process comprising:

reacting a calcium peroxide suspension with sodium metaborate solution and optionally with an aqueous hydrogen peroxide solution or with boric acid, and drying the resulting reaction mixture to obtain a homogeneous, boron-doped calcium peroxide as a solid product.

7. A process for producing a homogeneous, boron-doped alkaline earth peroxide according to claim 1, said process comprising:

reacting an aqueous solution or suspension of a homogeneous, alkaline earth mixed peroxide with sodium metaborate solution and aqueous hydrogen peroxide solution, or sodium metaborate solution, or boric acid, and evaporating water to obtain a solid and drying the solid to obtain the homogeneous, boron-doped alkaline earth peroxide product.

8. A method of treating agricultural seed, said method comprising applying to said seed a treatment composition comprising a homogeneous, boron-doped alkaline earth peroxide according to claim 1.

* * * * *